(12) United States Patent
Rowan et al.

(10) Patent No.: US 10,793,647 B2
(45) Date of Patent: Oct. 6, 2020

(54) **METHOD FOR PRODUCTION OF CELLULOSE NANOCRYSTALS FROM *MISCANTHUS GIGANTEUS* AND COMPOSITES THEREFROM**

(71) Applicant: CASE WESTERN RESERVE UNIVERSITY, Cleveland, OH (US)

(72) Inventors: Stuart Rowan, Chicago, IL (US); Mo Hunsen, Mount Vernon, OH (US); Amanda Way, Rocky River, OH (US)

(73) Assignee: CASE WESTERN RESERVE UNIVERSITY, Cleveland, OH (US)

( * ) Notice: Subject to any disclaimer, the term of this patent is extended or adjusted under 35 U.S.C. 154(b) by 0 days.

(21) Appl. No.: 15/984,746

(22) Filed: May 21, 2018

(65) Prior Publication Data

US 2018/0265598 A1  Sep. 20, 2018

Related U.S. Application Data

(62) Division of application No. 15/105,851, filed as application No. PCT/US2014/071366 on Dec. 19, 2014, now Pat. No. 10,000,578.

(60) Provisional application No. 61/918,993, filed on Dec. 20, 2013.

(51) Int. Cl.
| | | |
|---|---|---|
| *C08B 15/08* | (2006.01) | |
| *C08B 5/14* | (2006.01) | |
| *D21C 1/06* | (2006.01) | |
| *D21C 9/14* | (2006.01) | |
| *C08L 1/02* | (2006.01) | |
| *C08L 67/00* | (2006.01) | |
| *C08L 25/00* | (2006.01) | |
| *C08L 23/00* | (2006.01) | |
| *C08L 47/00* | (2006.01) | |
| *B82Y 40/00* | (2011.01) | |
| *C08B 15/02* | (2006.01) | |
| *C08L 1/04* | (2006.01) | |
| *C08L 71/02* | (2006.01) | |
| *C08L 77/00* | (2006.01) | |
| *D21C 1/04* | (2006.01) | |
| *D21H 11/18* | (2006.01) | |

(52) U.S. Cl.
CPC .............. *C08B 15/08* (2013.01); *B82Y 40/00* (2013.01); *C08B 5/14* (2013.01); *C08B 15/02* (2013.01); *C08L 1/04* (2013.01); *C08L 47/00* (2013.01); *C08L 67/00* (2013.01); *C08L 71/02* (2013.01); *C08L 77/00* (2013.01); *D21C 1/04* (2013.01); *D21C 1/06* (2013.01); *D21C 9/142* (2013.01); *D21H 11/18* (2013.01)

(58) Field of Classification Search
CPC ........................................................ C08L 1/04
See application file for complete search history.

(56) References Cited

U.S. PATENT DOCUMENTS

| | | |
|---|---|---|
| 8,344,060 B2 | 1/2013 | Weder et al. |
| 9,260,573 B2 | 2/2016 | Weder et al. |
| 2008/0057555 A1 | 3/2008 | Nguyen |
| 2009/0011474 A1 | 1/2009 | Balan et al. |
| 2009/0318590 A1* | 12/2009 | Weder ............... C08J 5/005 524/35 |
| 2013/0274350 A1 | 10/2013 | Okuma et al. |

FOREIGN PATENT DOCUMENTS

WO   WO2013000074 A1   1/2013

* cited by examiner

*Primary Examiner* — Wenwen Cai
(74) *Attorney, Agent, or Firm* — Hudak, Shunk & Farine Co. LPA

(57) ABSTRACT

Cellulose nanocrystals (CNCs) from the plant *Miscanthus Giganteus* (MxG) and a matrix material are present in a composite composition. Impressive yields of MxG-CNCs are obtained through a combination of processing steps including base hydrolysis, bleaching and acid hydrolysis. MxG-CNCs are produced having high aspect ratios, are biorenewable and can be used for a wide range of applications such as nanofillers in composites.

13 Claims, 8 Drawing Sheets

METHOD FOR PRODUCTION OF CELLULOSE NANOCRYSTALS FROM *MISCANTHUS GIGANTEUS* AND COMPOSITES THEREFROM

FIELD OF THE INVENTION

The present invention relates to methods for isolating cellulose nanocrystals (CNCs) from the plant *Miscanthus Giganteus* (MxG). Impressive yields are obtained through a combination of processing steps including base hydrolysis, bleaching and acid hydrolysis. MxG-CNCs are produced having high aspect ratios, are biorenewable and can be used for a wide range of applications such as nanofillers in composites. MxG-CNC-containing composites are also disclosed.

BACKGROUND OF THE INVENTION

Cellulose nanocrystals have been isolated from various organic sources. Cellulose is found primarily in plants, but is also present in selected marine animals such as sea tunicates, as well as algae, bacteria, and fungi for example.

CNCs from sea tunicates, microcrystalline cellulose and cotton have been shown to provide nanocomposites possessing an interesting stimuli-responsive behavior, see U.S. Pat. No. 8,344,060. The CNCs from sea tunicates have been demonstrated to have a high aspect ratio (L/D ca. 80) and their composites show superior mechanical reinforcement to other biosources. However, CNCs from sea tunicates are generally not suitable for industrial scale up.

CNCs isolated from plant sources, for example wood, are commercially available, but tend to have relatively low aspect ratios. Therefore, larger amounts of the CNCs need to be added into, for example, a polymer matrix in order to achieve significant reinforcement.

Accordingly, a problem of the invention was to discover a source for cellulose nanocrystals that is renewable, relatively inexpensive, and abundant, with at least these factors being critical for any large scale production.

A further problem of the invention is to provide a process for isolating cellulose nanocrystals that provides desirable yields thereof.

SUMMARY OF THE INVENTION

The problems of the invention are solved by processes for isolating cellulose nanocrystals from *Miscanthus Giganteus*. The processes of the present invention provide excellent yields of CNCs isolated from *Miscanthus Giganteus* (MxG-CNCs).

A further object of the present invention is to provide methods for isolating MxG-CNCs including a base hydrolysis step, a bleaching step and an acid hydrolysis step.

Yet another object of the present invention is to provide MxG-CNCs possessing relatively high aspect ratios.

Still another object of the present invention is to provide composite compositions including MxG-CNCs within a matrix composition, preferably a polymer matrix.

A further object of the present invention is to provide a composition including MxG-CNCs as nanofiller.

An additional object of the present invention is to provide MxG-CNCs having carboxyl functionality.

Another aspect of the present invention is a process for isolating cellulose nanocrystals from *Miscanthus Giganteus*, comprising the steps of performing a base hydrolysis step on a quantity of *Miscanthus Giganteus*; performing a bleaching step on a solid material recovered from the base hydrolysis step; performing an acid hydrolysis step on a solid material recovered from the bleaching step; and recovering cellulose nanocrystals from *Miscanthus Giganteus* after performing the acid hydrolysis step.

Accordingly, another aspect of the invention is a composite composition, comprising a matrix material; and cellulose nanocrystals from *Miscanthus Giganteus*.

BRIEF DESCRIPTION OF THE DRAWINGS

The invention will be better understood and other features and advantages will become apparent by reading the detailed description of the invention, taken together with the drawings, wherein.

DETAILED DESCRIPTION OF THE INVENTION

Figure 1:
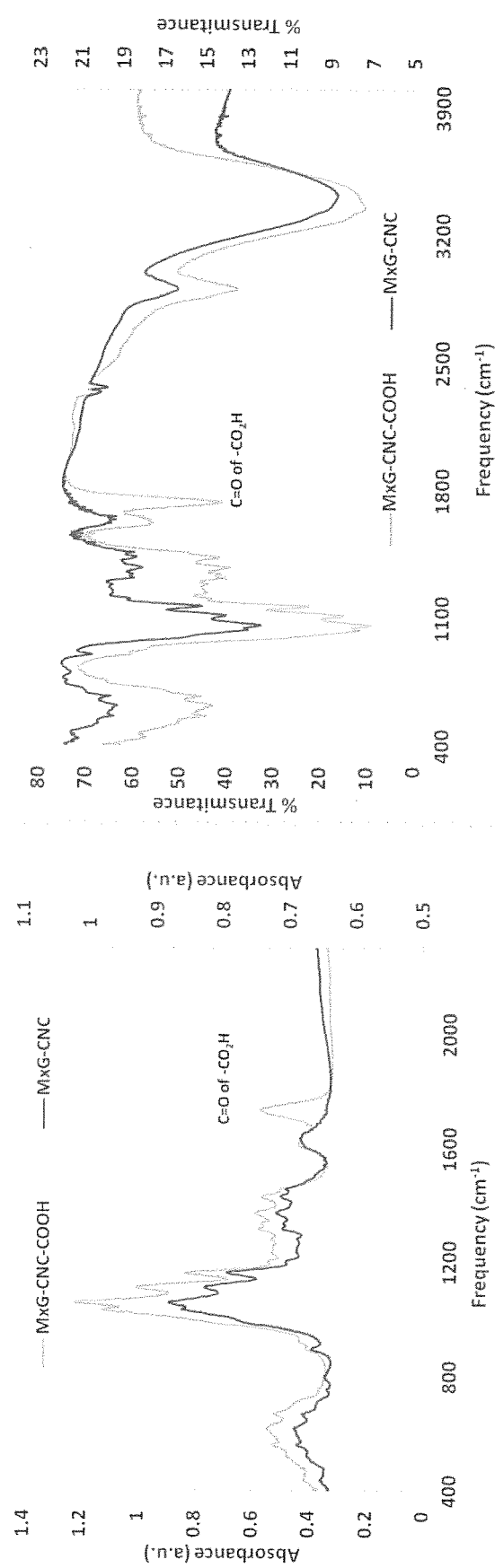
FIG. 1 is infrared spectra of *Miscanthus Giganteus* cellulose nanocrystals isolated from the raw material (MxG-CNC) and after TEMPO oxidation (MxG-CNC-$CO_2H$)
Figure 2B:
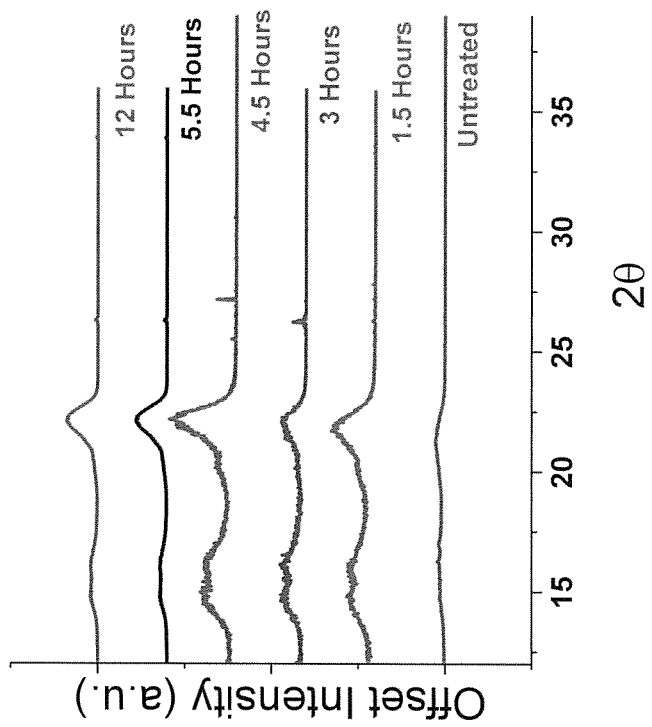
FIG. 2(B) is a graph illustrating that various ratios of amorphous to crystalline cellulose could be prepared as needed by varying the duration of the hydrolysis and that 97% crystallinity was achieved after 12 hours of hydrolysis by 1M HCL.
Figure 2A:
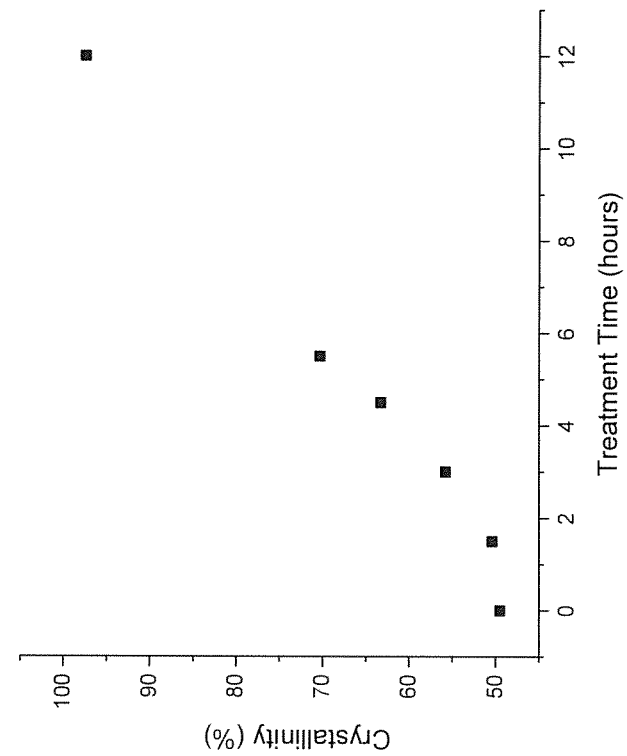
FIG. 2(A) illustrates a wide angle x-ray diffraction image of MxG-CNCs at different hydrolysis times by 1M HCl.
Figure 3B:
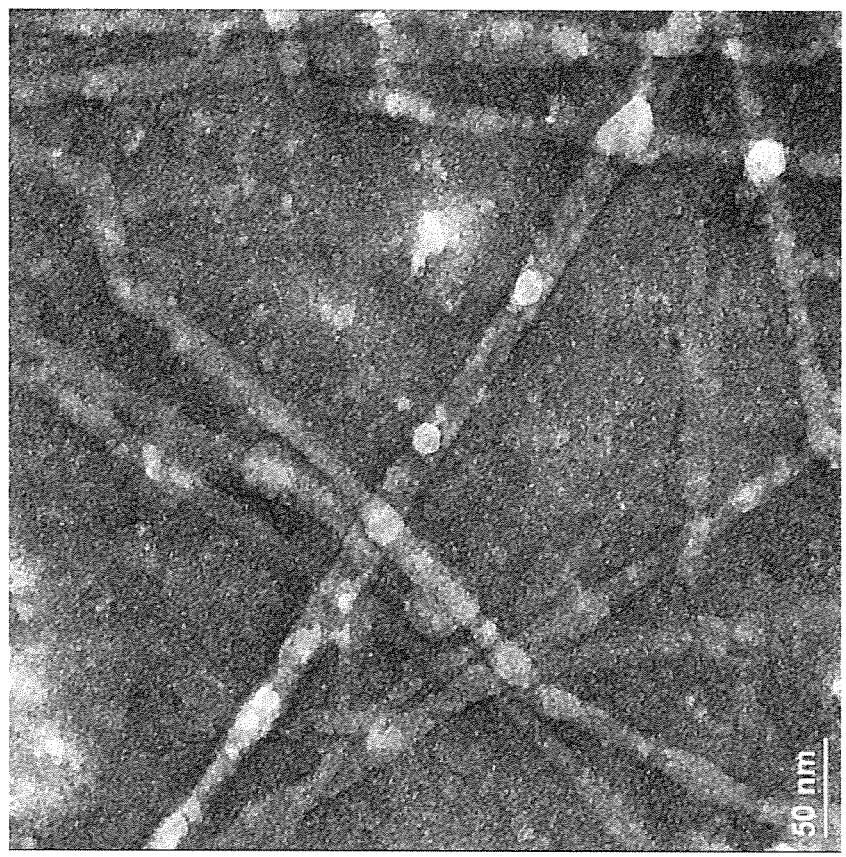
FIGS. 3(A) and (B) are transmission electron microscopy (TEM) images of MxG-CNC.
Figure 3A:
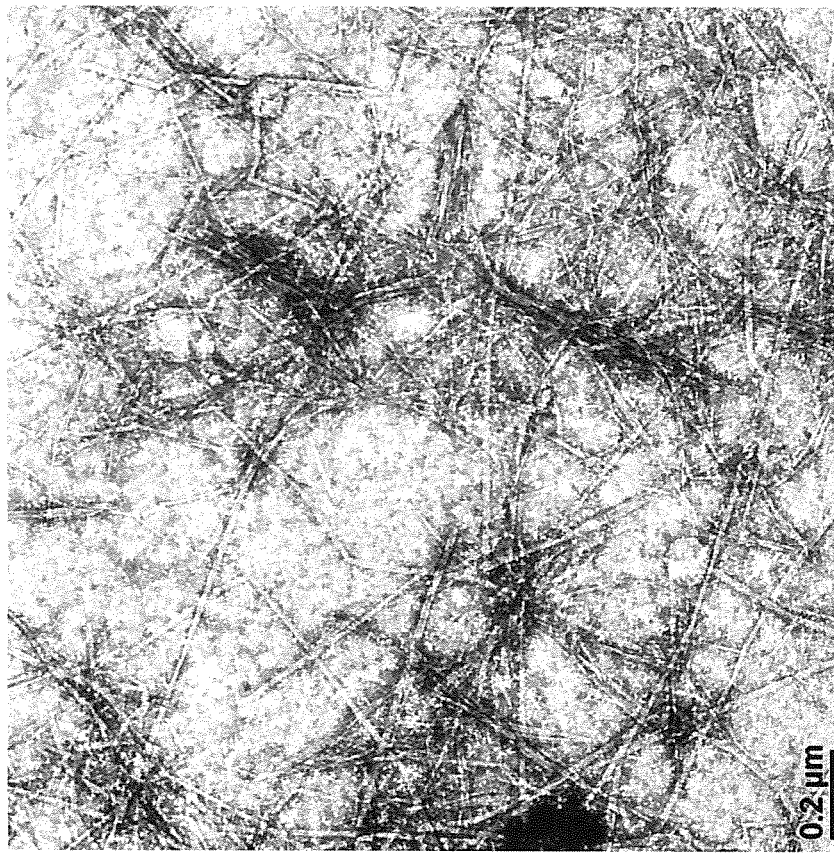
Figure 4:
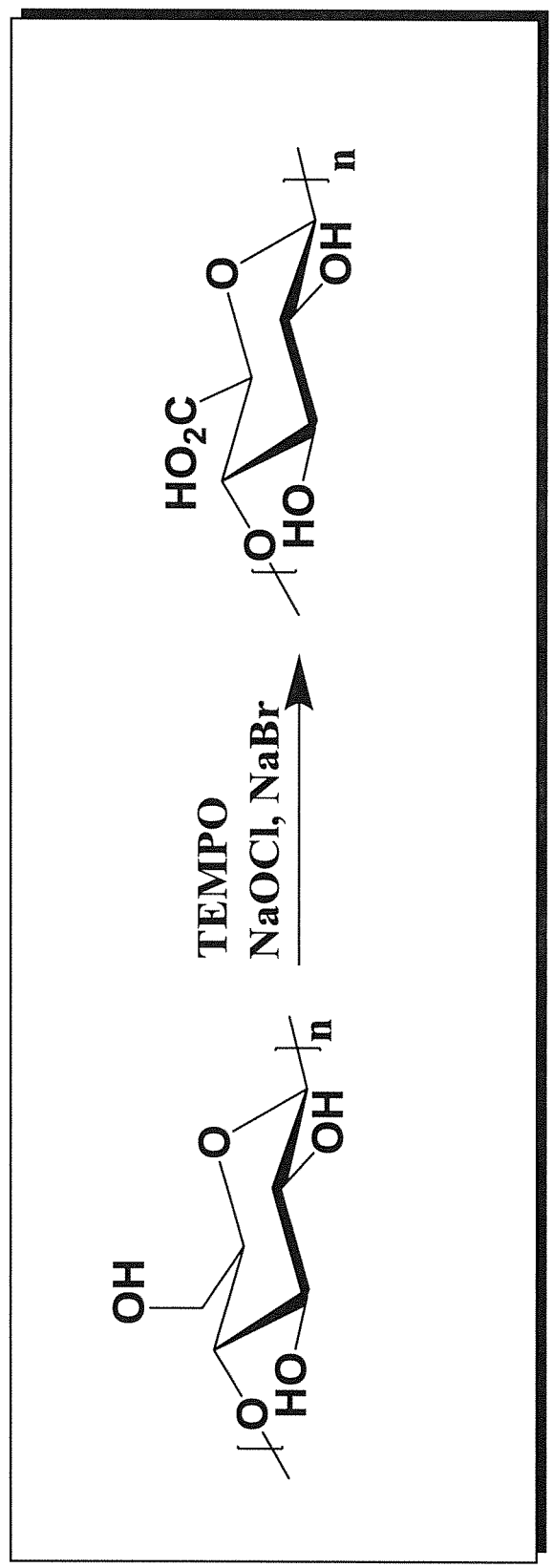
FIG. 4 illustrates a tempo oxidation reaction sequence of MxG-CNC to MxG-CNC-$CO_2H$.
Figure 5:
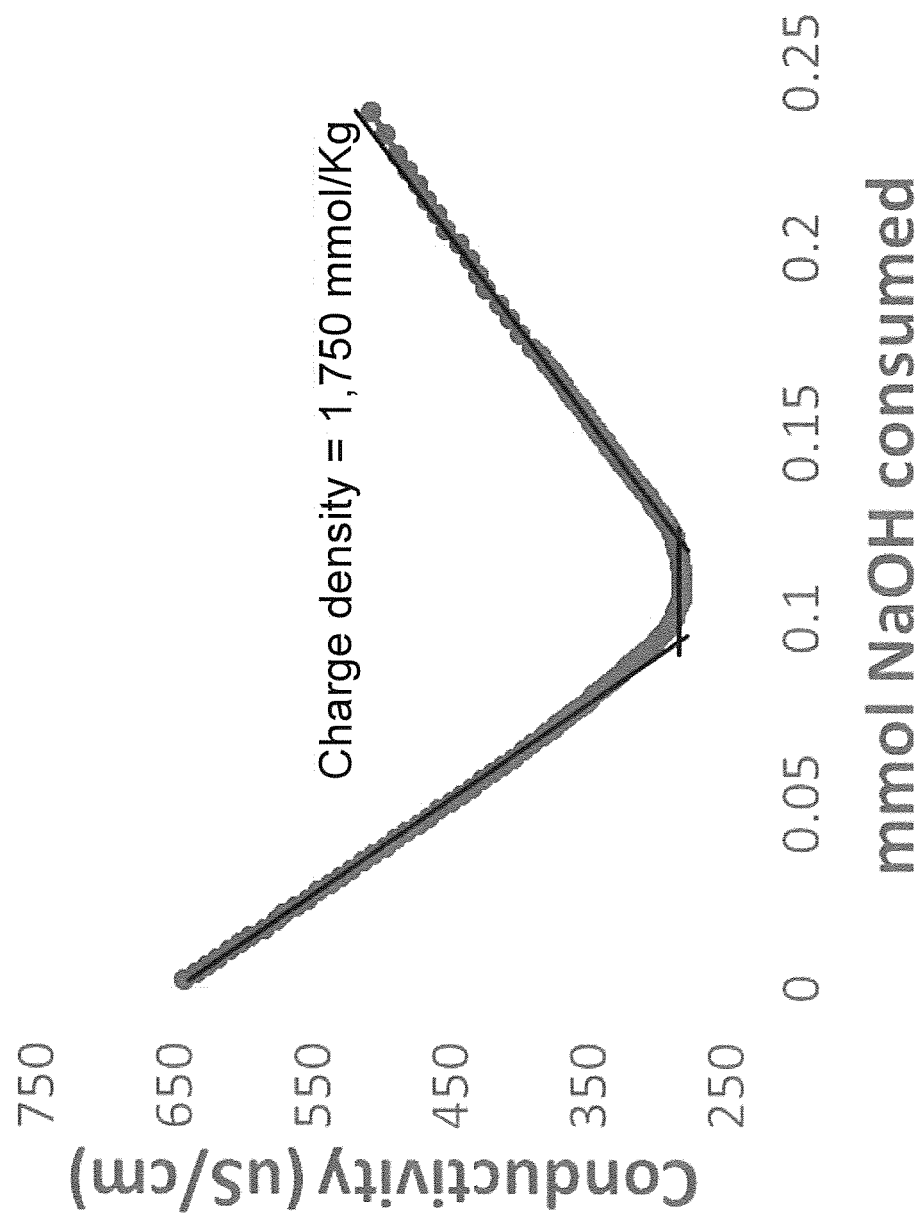
FIG. 5 is a graph illustrating charge density of MxG-CNC-$CO_2H$.
Figure 6:
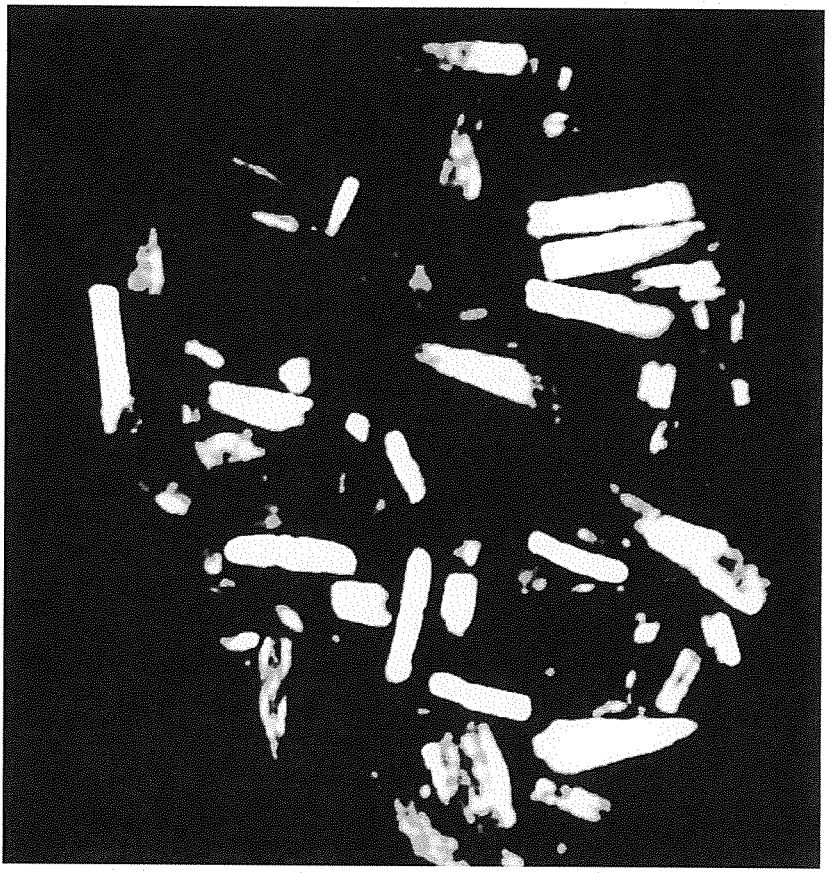
FIG. 6 is an image showing birefringence of MxG-CNC-$CO_2H$.
Figure 6:
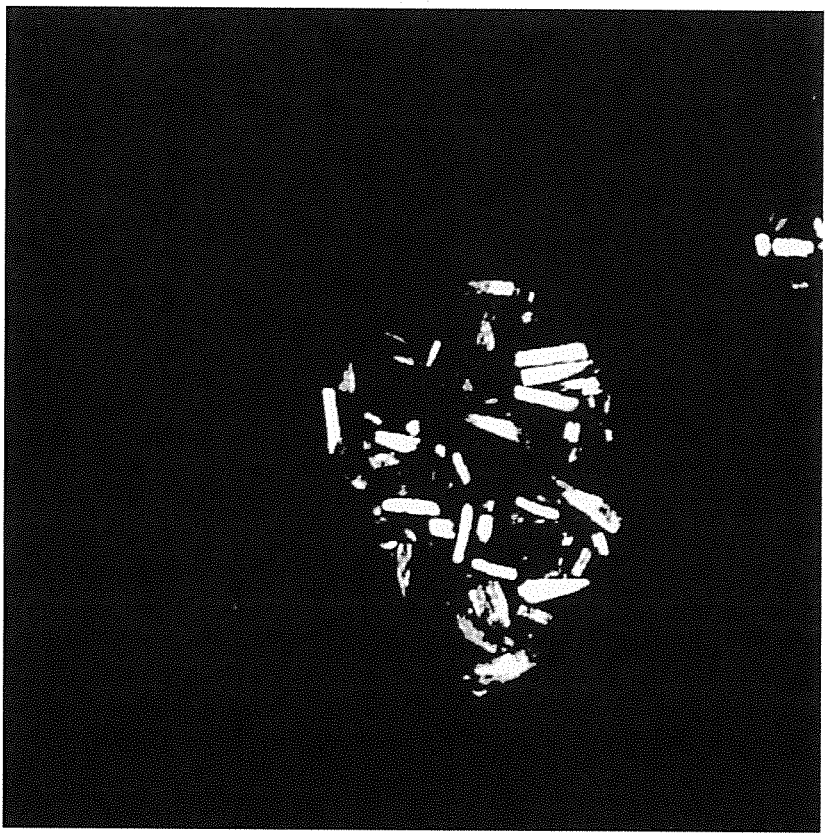

*Miscanthus Giganteus* is a perennial, non-invasive grass hybrid that originates in Asia. It is currently being grown in different locations around the globe and has been used to make electricity, heat, and as a feed stock for biofuels. *Miscanthus Giganteus* gives superior yields of dry mass compared to other plants, including switch grass or corn. When suitable growing conditions are achieved, more than 12 tons of dry mass per acre can be obtained from *Miscanthus Giganteus*, which is generally more than twice that of switch grass or corn.

It has been discovered that cellulose nanocrystals can be isolated from *Miscanthus Giganteus*. The isolated *Miscanthus Giganteus* cellulose nanocrystals, herein MxG-CNCs, can be utilized in a wide range of compositions and have particular application as a nanofiller.

In a first step, a desired amount of *Miscanthus Giganteus* is obtained. In a further step, the *Miscanthus Giganteus* is comminuted with appropriate equipment that is typically utilized to reduce the average particle size of solid material to a smaller average particle size, for example by grinding, milling, crushing, or the like. Various types of mills and crushers are known in the art and include, but are not limited to, blenders, ball mills, hammer mills, roller mills or presses, vibration mills, jet mills, cone crushers, hammer crushers and jaw crushers.

After *Miscanthus Giganteus* particles of a desired consistency or particle size are obtained, a base hydrolysis step is performed to hydrolyze the *Miscanthus Giganteus*. In one embodiment, the comminuted *Miscanthus Giganteus* is soaked in a basic solution having a pH of about 12 to about 14 or 16. Preferably a plurality of treatments are utilized in one embodiment, with two to four treatments desired and three treatments preferred. After the particles are immersed, soaked or otherwise wetted or contacted with the desired basic solution, the hydrolyzed particles are filtered and washed with distilled water in order to bring an end to or otherwise complete a particular base hydrolysis treatment operation.

In one embodiment, the *Miscanthus Giganteus* can be placed in a 2 weight percent sodium hydroxide solution at room temperature for 24 hours followed by two treatments with 2 weight percent sodium hydroxide solution at 100° C. for 22 hours to hydrolyze the comminuted *Miscanthus Giganteus*. Aqueous sodium hydroxide (about 1 weight percent to about 4 weight percent), from about room temperature to about 100° C., and from about 12 to about 72 hours could be used for the base hydrolysis step. In addition, a higher weight percent sodium hydroxide solution could also be used for the initial base hydrolysis step. In another embodiment, a 3 weight percent sodium hydroxide solution at 100° C. for 3 hours can be utilized with this step repeated a plurality of times, for example 3 times wherein the material is filtered and washed with distilled water after each soak, which reduces the total base hydrolysis duration to 12 hours total. Alternatively a more dilute sodium hydroxide solution for a prolonged duration is another alternative. One could also use other bases such as, but not limited to, MOH (where M is a cationic counter ion) for the base hydrolysis step. After completion of the desired base hydrolysis, a solid material is filtered and washed with distilled water.

After the base hydrolysis step has been performed, a bleaching step is initiated on the solid material recovered to remove the non-cellulose component and color. In one embodiment, one or more of sodium chlorite and/or sodium hypochlorite are utilized in a solution at a concentration of between about 0.5 and about 4 weight percent along with acetic acid at a concentration between about 0.2 and about 9 weight percent. Preferably the mixture is stirred/mixed during the bleaching step. The duration of the step ranges from about 1 to about 3 hours at a temperature of about 50° C. to about 80° C. Alternatively, the process can be performed for about 12 to about 24 hours at room temperature. The solution is filtered and washed with distilled water to obtain the solid product.

An acid hydrolysis step is performed on the solid material obtained from the bleaching step. The solid material is placed in an acid, such as but not limited to hydrobromic acid, phosphoric acid, sulfuric acid, and hydrochloric acid, with the concentration of acid ranging from about 0.5 molar to about 18 molar and desirably from about 9 molar to about 12 molar for a suitable period of time. In one embodiment the acid hydrolysis step is performed in a 1M HCl solution for about 0.5 to about 24 hours. A higher concentration of acid is generally used for a shorter duration or a lower amount of acid for a longer duration.

Figure 7:
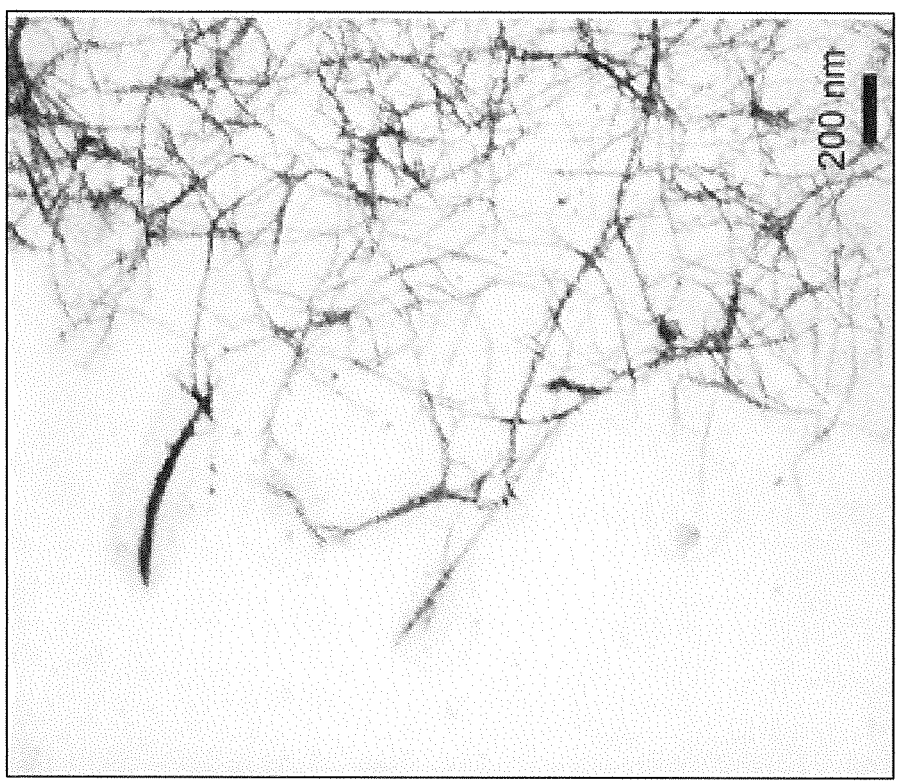
FIG. 7 is a transmission electron microscopy (TEM) image of sulfonated MxG-CNC, MxG-CNC isolated using sulfuric acid.

Utilizing sulfuric acid produces sulfonated MxG-CNCs. In one embodiment 9 molar sulfuric acid at 40° C. for one hour can be utilized. FIG. 7 shows the TEM of sulfonated MxG-CNCs. One could also use a higher or lower amount of sulfuric acid for shorter or longer hydrolysis times, respectively to isolate sulfated MxG-CNCs.

The acid hydrolysis step is preferably performed under heat (70-100° C.).

2,2,6,6-Tetramethylpiperidine-1-oxyl (TEMPO) oxidation can also be utilized to prepare MxG-CNCs with carboxyl functionality. The MxG-CNCs (1.45 g) were dispersed in 150 mL distilled water followed by addition of TEMPO (0.123 g) and NaBr (1.23 g) and 200 wt. % (compared to mass of CNCs in solution) of NaOCl. The mixture was stirred for 4.5 hours after adjusting the pH to 10-11 with 10 M NaOH solution. NaCl (5.0 g) was then added to the mixture and stirred for 10 more minutes. The mixture was the centrifuged to decant the supernatant. The residue was then washed with 1 M NaCl (×3) and centrifuged to decant the supernatant and then subsequently washed with 0.1 M HCl (×3) and centrifuged to decant the supernatant. The oxidized MxG-CNCs were then dialyzed for 24 hours against distilled water and freeze-dried using a lyophilizer to yield 1.09 g of white oxidized MxG-CNC-COOH. The concentration of —COOH functional groups on the surface of the cellulose nanocrystals was determined via a conductometric analysis. A solution of 0.05 wt. % MxG-CNC-COOH was dispersed in water via a 12 hr sonication. Hydrochloric acid (12 M) was then added in 10 µl increments until the pH of the solution reached ca. 3. Titrations were then performed with a 0.01 M sodium hydroxide solution in multiples of three, yielding an average carboxylate concentration of 1,750 mmol/Kg. By controlling the amount of the reagents (TEMPO, NaOCl and NaBr) added and the time of the reaction it is possible to alter the amount of oxidation.

As utilized herein, the term composite and/or composition including the MxG-CNCs is defined as a material including 1) the MxG-CNCs as well as 2) at least one other material that is not MxG-CNC and therefore has different physical and/or chemical properties. That said, many different types of materials can be mixed with the MxG-CNCs in order to form a composition or composite. Various materials include, but are not limited to one or more polymers, one or more liquids and one or more non-polymeric materials. The MxG-CNCs can be utilized in many different applications including, but not limited to, paper, plastics, rubber, paints, coatings, adhesives and sealants. Compositions and composites including the MxG-CNCs can include any desired amount thereof. In one non-limiting embodiment, the MxG-CNCs are used in an amount from about 1 to about 20 parts based on 100 total parts by weight of polymer.

Polymer nanocomposites can be prepared utilizing the MxG-CNCs as the nanoparticles in the compositions and procedures described in U.S. Pat. No. 8,344,060, herein fully incorporated by reference. In additional embodiments or aspects of the invention, one or more polymers or copolymers are mixed with or otherwise combined with MxG-CNCs, with varying surface functionalities, to form polymer nanocomposites comprising MxG-CNCs. Many different polymers or copolymers can be utilized with examples including, but not limited to, various alkylene oxide polymers and copolymers such as ethylene oxide, propylene oxide, copolymers of ethylene oxide and epichlorohdrin and/or other monomers; a vinyl aromatic (co)polymer such as polystyrene and styrene copolymers; polyolefin polymers or copolymers such as polyethylene and polypropylene; diene polymers and copolymers, such as cis-polybutadiene; polyacrylates and acrylate copolymers, such as methyl methacrylate; poly(vinyl acetate); poly(vinyl alcohol); polyamides; poly(urethanes) and polyester polymers or copolymers such as polycaprolactone, poly(ethylene terephthalate) or polylactate.

In one embodiment, a the solution containing the desired (co)polymer(s) and MxG-CNCs can be mixed as desired, such as in order to obtain a substantially homogenous mixture, and then the solution can be cast or otherwise placed into a desired form and dried in order to produce a finished composite. In one embodiment the solution can be dried in a vacuum oven wherein suitable pressures, temperatures and drying times will vary depending upon the system utilized. Various additives as known to those of ordinary skill in the art can be added to the composition in any desired amounts.

Figure 8:
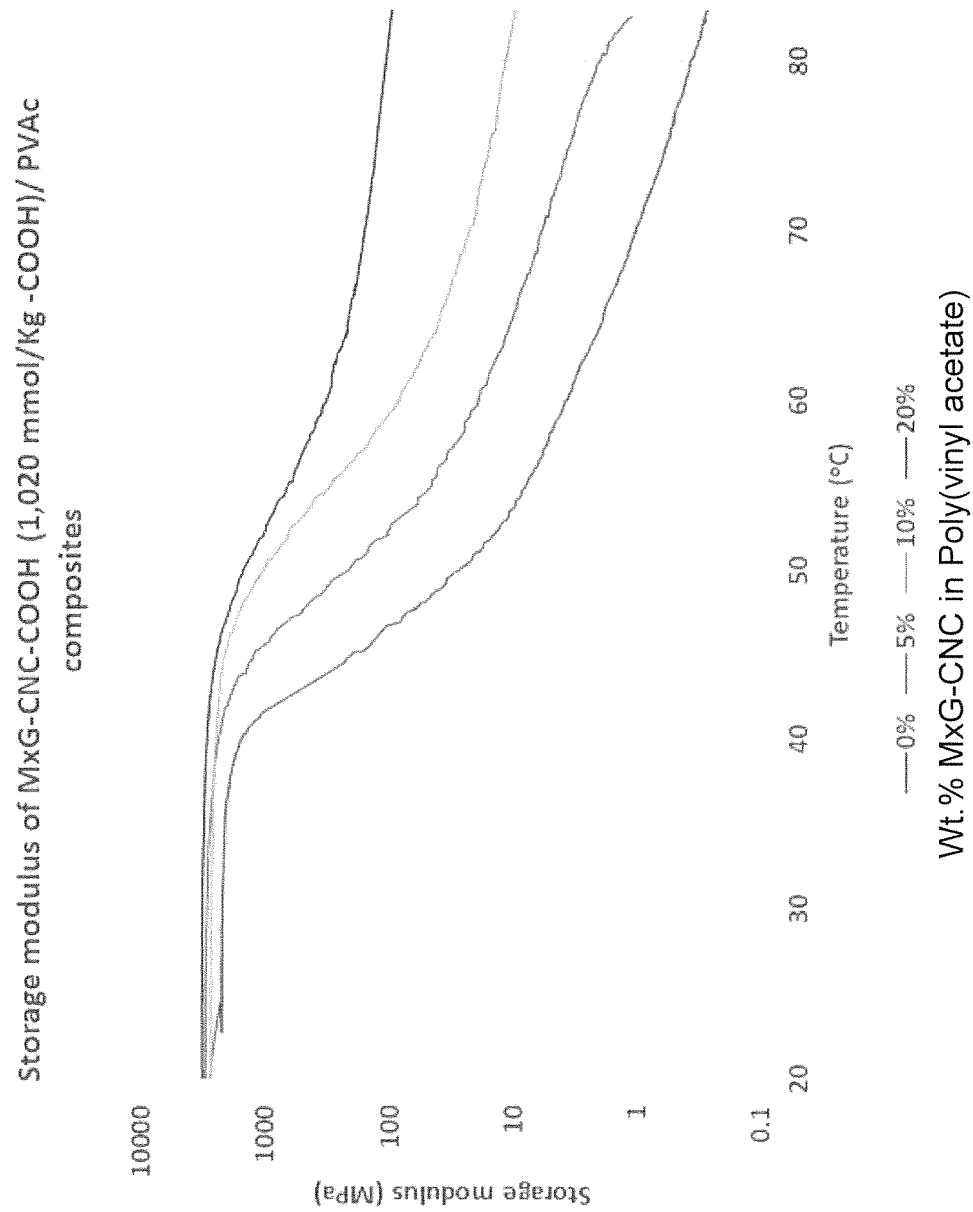
FIG. 8 shows the Dynamic Mechanical Analysis (DMA) of nanocomposites of MxG-CNCs in a PVAc matrix

As an example, the incorporation of the MxG-CNCs into a poly(vinyl acetate) matrix (produced by mixing appropriate amounts of a dispersion of the MxG-CNCs in dimethylformamide with a solution of the polymer in dimethylformamide followed by drying in a vacuum oven) yielded films that showed a significant mechanical enhancement above the glass transition temperature of the material (FIG. 8). For example, MxG-CNCs were sonicated in DMF overnight to prepare a 3 mg/mL dispersion and PVAc was dissolved by stirring in DMF to prepare a 50 mg/mL solution. Nanocomposites were then prepared by combining the PVAc solution in DMF and the dispersion of MxG-CNCs in DMF into Teflon® Petri dishes. The amounts of MxG-CNCs and PVAc was varied such that it resulted in a range of 1-20 weight percent of MxG-CNCs in the PVAc matrix after evaporation of the solvent. The dishes were placed into a vacuum oven (65° C., 15 mbar, 5 days) to remove the solvent. The material was compression-molded in a Carver laboratory press at 87° C. and 3000 psi for 5 min to yield the nanocomposite films. The mechanical properties of the nanocomposites were then characterized by dynamic mechanical analysis.

EXAMPLES

Comparative Example 1

As no procedure is believed to be known to isolate cellulose nanocrystals from *Miscanthus Giganteus*, a procedure for isolating cellulose nanocrystals from wood was utilized based upon the following references: Salajkov, M.; Berglund, L. A.; Zhou, Q. *J. Mater. Chem.* 2012, 22, 19798-19805. Alemdar, A.; Sain, M. *Comp. Sci. & Tech.* 2008, 68, 557-565.

Cellulose nanocrystals from *Miscanthus Giganteus* were obtained from the following procedure. The blended stalk was exposed to potassium hydroxide solution (5 wt. %) at 80° C. for 15 hours and filtered. The solid was stirred in acetic acid (0.015 mL) and sodium hypochlorite (0.03 mL) solution (30 mL DI water) until the solution became white (ca. 6 hours) and filtered. The resulting solid was then acid hydrolyzed with hydrochloric acid (12 M, 1 mg/mL) for 1.5 hr at reflux to give a yield of 1 wt. % of white solid (78% crystallinity by WAXS).

Comparative Example 2

In view of the poor yield and low degree of crystallinity obtained, a second attempt was made utilizing a procedure set forth in the following reference: Helbert, W.; Cavaille, J. Y.; Dufresne, A. Polymer Composites 1996, 17, 604-611.

The blended stalk was exposed to sodium hydroxide solution (2 wt. %) at 80° C. for 4 hours and filtered. After filtration, the process of NaOH wash and filtration as above was repeated 5 more times. After the final filtration the solid was stirred in an acetic acid (7.5%) sodium hypochlorite (1.7%), and sodium hydroxide (2.7%) solution until the solid became white (ca. 12 hours) and then was filtered. The resulting solid was then put in 1 M hydrochloric acid (1 mg solid/1 mL HCl) and refluxed for 12 hr to give a yield of 8 wt. %. WAXS analysis showed this material was ca. 97% crystalline.

Examples of the Invention

In view of the low yields, the following procedures were invented to produce relatively high yields of MxG-CNCs.

Base Hydrolysis Step

We have carried out an initial soaking of the *Miscanthus* stalk in 2 wt. % sodium hydroxide solution at room temperature for 24 hours followed by two treatments with 2 wt. % sodium hydroxide solution at 100° C. for 22 hours to hydrolyze the *Miscanthus* stalk. In addition, a higher wt. % sodium hydroxide solution could also be used for the initial base hydrolysis step. For example, we have used a 3 wt. % sodium hydroxide solution at 100° C. for 3 hours and repeating this step three times (filtering and washing with distilled water at each step) thus reducing the total base hydrolysis duration to 12 hours total (as opposed to 24 hours total in procedure attempt 2 described above). Using a more dilute sodium hydroxide solution for a prolonged duration is another alternative.

Bleaching Step

We have used sodium chlorite instead of sodium hypochlorite as an alternative for the bleaching step resulting in a much whiter product in a short amount of time (1-3 hr at 50-80° C. or 12-24 hr at room temperature). We have also shown that the bleaching step could be performed either before or after the hydrolysis step to yield a white product.

Acid Hydrolysis Step

We have shown that the acid hydrolysis step using 1 M HCl for 6-15 hr gave CNCs with a higher % crystallinity. Alternatively, one can use a slightly higher concentration of HCl for shorter duration or a lower amount of HCl for a longer duration. Phosphoric acid is another viable alternative for this step. Using 9 M sulfuric acid at 40° C. for 1 hour resulted in sulfated MxG-CNCs. One could also use a higher or lower amount of sulfuric acid for a shorter or longer hydrolysis times, respectively, to isolate sulfated MxG-CNCs.

An Example of another preferred embodiment is as follows:

*Miscanthus Giganteus* stalk (16.73 g) was soaked in 300 mL of 2 wt. % sodium hydroxide solution at room temperature for 24 hours followed by two treatments with 250 mL of 2 wt. % sodium hydroxide solution at 100° C. for 22 hours, filtering and washing with distilled water at each step. Bleaching solution (225 mL) containing 2.25 g sodium chlorite and 15 drops of glacial acetic acid was then added and the mixture heated for 2 hours at 68° C. The mixture was filtered and washed with distilled water to yield a white solid. The resulting solid was then hydrolyzed with 200 mL of 1 M hydrochloric acid at 75° C. for 15 hours to give a yield of 33.2 wt. % MxG-CNCs.

While in accordance with the patent statutes the best mode and preferred embodiment have been set forth, the scope of the invention is not limited thereto, but rather by the scope of the attached claims.

What is claimed is:

1. A composite composition, comprising:
a matrix material; and cellulose nanocrystals from *Miscanthus Giganteus* having carboxyl functionality,
   wherein the matrix material comprises one or more polymers or copolymers, wherein the polymers or copolymers comprise an alkylene oxide (co)polymer, a vinyl aromatic (co)polymer, a polyolefin (co)polymer, a diene (co)polymer, a polyacrylate (co)polymer, poly(vinyl acetate), poly(vinyl alcohol), a polyimide, a polyurethane, a polyester, or a combination thereof, wherein the nanocrystals are derived from a process comprising the steps of:

performing a base hydrolysis step on a quantity of the *Miscanthus Giganteus*;

performing a bleaching step on a solid material recovered from the base hydrolysis step;

performing an acid hydrolysis step on a solid material recovered from the bleaching step; and recovering cellulose nanocrystals from the *Miscanthus Giganteus* after performing the acid hydrolysis step.

2. The composite composition according to claim 1, wherein the cellulose nanocrystals from *Miscanthus Giganteus* are present in an amount of 1 to 20 parts based on 100 parts by weight of the matrix material.

3. A paper, plastic, rubber, paint, coating, adhesive or sealant comprising the composition according to claim 1.

4. The composite composition according to claim 1, wherein prior to performing the base hydrolysis step a quantity of *Miscanthus Giganteus* is obtained and comminuted to a smaller average particle size.

5. The composite composition according to claim 4, wherein the base hydrolysis step includes contacting the *Miscanthus Giganteus* with a basic solution having a pH of about 13 to about 14, and wherein the base utilized has a formula of MOH, wherein M is a cationic counter ion.

6. The composite according to claim 5, wherein the bleaching step comprises contacting acetic acid and one or more of sodium chlorite or sodium hypochlorite with the solid material recovered from the base hydrolysis step, wherein the one or more of the sodium chlorite or sodium hypochlorite are present in a concentration between about 0.5 and about 4 weight percent and the concentration of acetic acid is between about 0.2 and about 9 weight percent.

7. The composite according to claim 6, wherein the bleaching step is performed for about 1 to about 3 hours at a temperature of about 50° C. to about 80° C., wherein mixing is performed during at least part of the time period.

8. The composite according to claim 7, wherein the acid hydrolysis step comprises contacting the solid material recovered from the bleaching step with an acid having a concentration ranging from 0.5 molar to about 18 molar.

9. The composite according to claim 8, wherein the acid is one or more of hydrobromic acid, phosphoric acid, sulfuric acid or hydrochloric acid.

10. The composite according to claim 9, wherein the acid hydrolysis step is performed for about 0.5 to about 24 hours.

11. The composite according to claim 10, further including the step of adding carboxyl functionality to the recovered cellulose nanocrystals.

12. A paper, plastic, rubber, paint, coating, adhesive or sealant comprising the composition according to claim 2.

13. A paper, plastic, rubber, paint, coating, adhesive or sealant comprising the composition according to claim 1.

* * * * *